United States Patent [19]

Hayashi

[11] Patent Number: 4,679,073
[45] Date of Patent: Jul. 7, 1987

[54] COLOR IMAGE READING APPARATUS WITH WHITE BALANCE SYSTEM FOR CONTROLLING THE INTENSITY OF A LIGHT SOURCE ILLUMINATING A COLOR DOCUMENT

[75] Inventor: Kimiyoshi Hayashi, Tokyo, Japan

[73] Assignee: Canon Kabushiki Kaisha, Tokyo, Japan

[21] Appl. No.: 544,240

[22] Filed: Oct. 21, 1983

[30] Foreign Application Priority Data

Oct. 27, 1982 [JP] Japan .................. 57-188815

[51] Int. Cl.[4] .................. G03F 3/08; H04N 1/46; H04N 9/73
[52] U.S. Cl. .................. 358/80; 358/29; 358/75
[58] Field of Search .................. 358/29, 75, 78, 80, 358/163; 355/69

[56] References Cited

U.S. PATENT DOCUMENTS

| | | | |
|---|---|---|---|
| 3,898,006 | 8/1975 | Kimura et al. | 355/69 |
| 4,136,360 | 1/1979 | Hoffrichter et al. | 358/80 |
| 4,454,532 | 6/1984 | Itani et al. | 358/29 |
| 4,523,229 | 6/1985 | Kanmoto | 358/163 |
| 4,524,388 | 6/1985 | Abe et al. | 358/163 |

FOREIGN PATENT DOCUMENTS

| | | | |
|---|---|---|---|
| 2559826 | 4/1979 | Fed. Rep. of Germany | 358/80 |
| 79567 | 6/1980 | Japan | 358/163 |
| 112685 | 8/1980 | Japan | 358/163 |
| 135468 | 10/1980 | Japan | 358/163 |
| 58370 | 5/1981 | Japan | 358/75 |

Primary Examiner—James J. Groody
Assistant Examiner—Randall S. Svihla
Attorney, Agent, or Firm—Fitzpatrick, Cella, Harper & Scinto

[57] ABSTRACT

In a color image reading apparatus, a CCD line image sensor reads a color document illuminated by a light source three times in succession through red, green and blue filters to produce red, green and blue color component signals. Prior to reading the color document, the line sensor reads a standard reference area illuminated by the light source to produce red, green and blue reference color component signals. The intensity of the light source is adjusted so that the level of the reference color component signals is equal to a predetermined value. Red, green and blue control signals corresponding to the light intensities at which the levels of the red, green and blue reference color component signals are equal to the predetermined value are stored. These stored control signals are used to control the intensity of the light source while the line sensor reads the document to produce the red, green and blue color component signals. The standard reference area may be a white area, or may be made up of separate red, green and blue areas.

9 Claims, 12 Drawing Figures

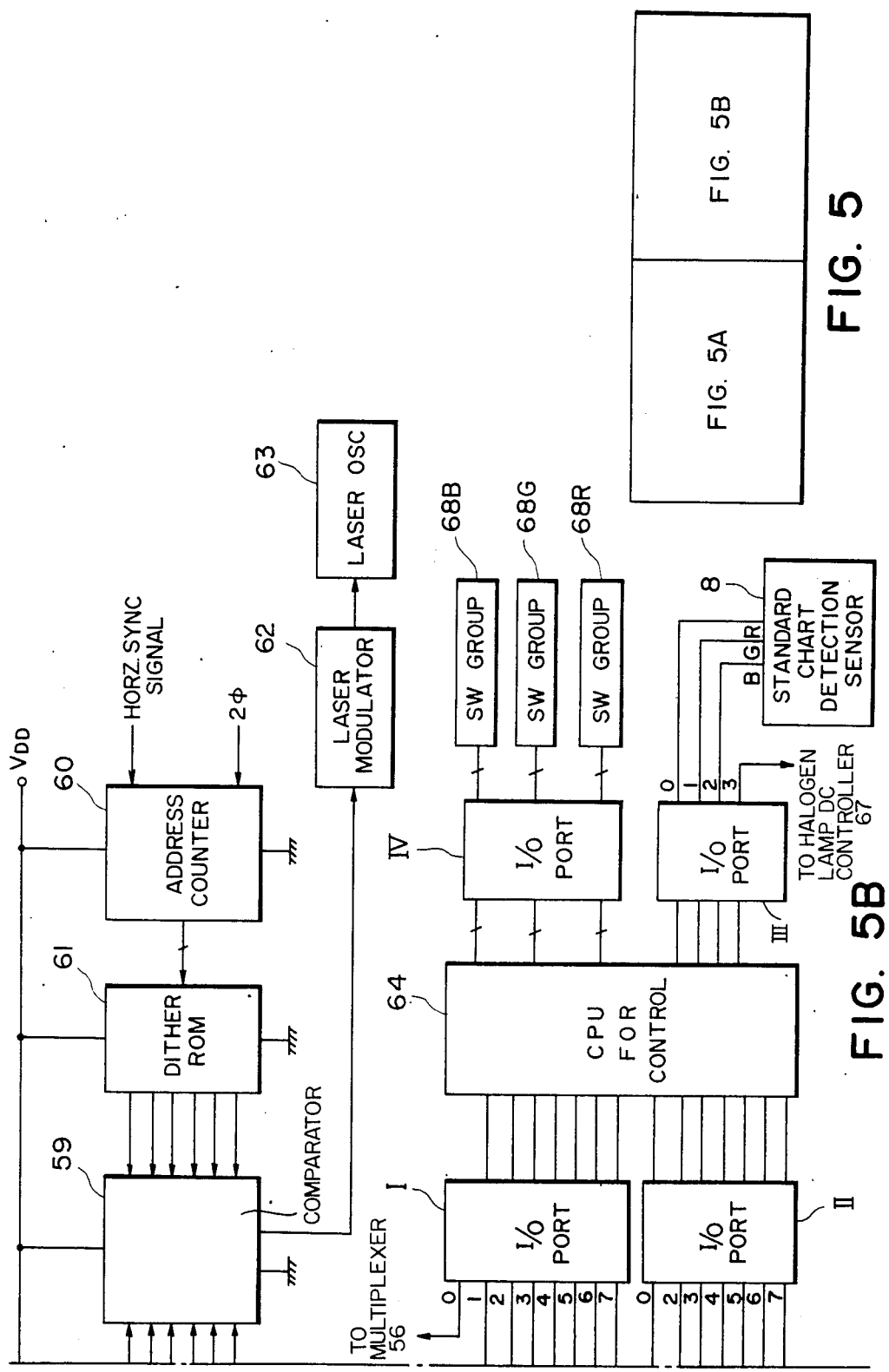

COLOR IMAGE READING APPARATUS WITH WHITE BALANCE SYSTEM FOR CONTROLLING THE INTENSITY OF A LIGHT SOURCE ILLUMINATING A COLOR DOCUMENT

BACKGROUND OF THE INVENTION

1. Field of the Invention

The present invention relates to a color image reading apparatus in which a color original is exposed and the transmitted or reflected light therefrom is guided to imaging devices such as charge-coupled devices for achieving color-separated reading of said original.

2. Description of the Prior Art

In known color image reading apparatus in which an original is illuminated with a light source and the reflected light therefrom is color separated with color separation filters and read with imaging devices such as charge-coupled devices (CCD's) it is difficult to maintain a constant ratio among image signal levels of different colors due, for example, to uneven spectral distribution of the emission from the light source. As an example, in case of a halogen lamp which is commonly used as the light source in such information reading apparatus, the output signals from a CCD become greater in the order of blue (B), green (G) and red (R) as shown in FIG. 1. Thus, as the output levels of the image signals from the imaging device increase in the above-mentioned order in case a color original is illuminated with a single light source, it is not possible to expect an exact reproduction of the relative levels of different colors on the original. The above-mentioned spectral distribution of the light source, for example of a halogen lamp, also varies with the lapse of time. Besides the color balance in a color image reading apparatus is affected by the relative difference in the spectral sensitivities of a CCD in the regions of blue, green, red and near-infrared, cut-off wavelengths of color separation filters, the difference in the transmission levels of said filters in the regions of blue, green and red, and the difference in the near-infrared cut-off wavelength and the visible light transmission of a near-infrared cut-off filter used for improving the color separating function by reducing the near-infrared transmission of the color separation filters. Particularly in case of reproducing a color image by connecting a color image reading apparatus with a color laser beam printer, satisfactory image quality cannot be obtained even with a slight difference in the output signal levels of different colors, due to aberrated color balance among the images of different colors.

In order to adjust the color balance it has been proposed to supply the light source with a manually determined control voltage for each color-separated exposure, but such method is not only complicated and difficult but also is not effective for the aberration or fluctuation of the sensitivity of a photoelectric converting element such as a CCD and of various sensors.

SUMMARY OF THE INVENTION

In consideration of the foregoing, an object of the present invention is to eliminate the aforementioned drawbacks of conventional color image reading apparatus, and to control the output signal level to a determined value regardless of the unevenness in the spectral emission of the light source and the fluctuation in the spectral sensitivity of the imaging device.

Another object of the present invention is to provide a color image reading apparatus capable of appropriately correcting the light intensity from the light source by means of the image output signals through a simple structure.

Still another object of the present invention is to provide a color image reading apparatus capable of maintaining an appropriate exposure at the color image reading.

The foregoing and still other objects of the present invention and the resulting advantages will become fully apparent from the following description.

BRIEF DESCRIPTION OF THE DRAWINGS

FIG. 5 shows how FIGS. 5A and 5B are assembled to form a block diagram of an image signal processing device for use in the color image reading apparatus embodying the present invention;

DETAILED DESCRIPTION OF THE PREFERRED EMBODIMENTS

Now the present invention will be explained in detail in the following description of a color image reading apparatus to be taken in conjunction with FIG. 2 and ensuing figures, in which a reading optical system, an image signal output device, an image signal processing device and the overall function of them will be explained in succession in this order.

In the following embodiment, the image information to be read by the reading device may not only include information contained in a document, photograph, map or chart representing an image, characters, symbols etc. but may also information such as patterns on planar articles such as fabrics or textiles. In the present specification an original shall mean a substrate or carrier for such information.

At first, an explanation of the image reading optical system will be given while making reference to FIGS. 2 and 3.

Figure 2:
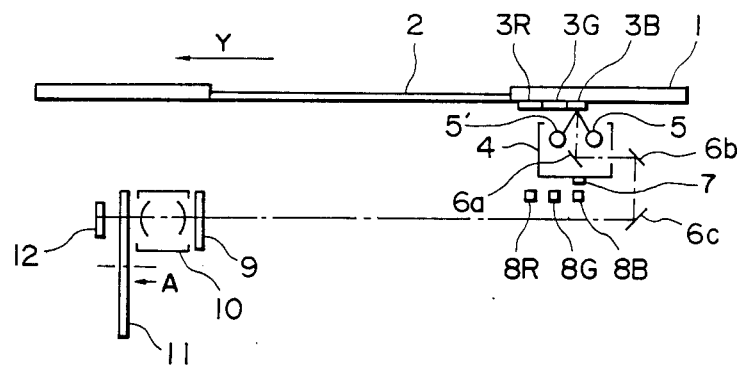
FIG. 2 is a cross-sectional view of an image reading optical system of a color image reading apparatus embodying the present invention.
Figure 3:
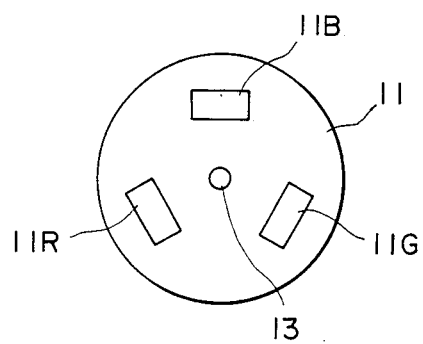
FIG. 3 is a front view, seen from a direction A in FIG. 2, of color separation filters shown in FIG. 2.

FIG. 2 shows the image reading optical system for use in a color image reading apparatus embodying the present invention, wherein an original carriage 1; an original 2; reference charts or areas 3B, 3G, 3R respectively for blue, green and red colors; and a scanning unit 4 comprising lamps 5,5' and a mirror 6a are illustrated. One of said lamps 5, 5' may be dispensed with if desirable. Said lamps 5, 5' are preferably composed of halogen lamps or fluorescent lamps and are assumed to be the former in the following description. The scanning unit 4 moves along an unrepresented rail in a direction Y at a determined speed for performing subsidiary scanning for the original 2. Mirrors 6b, 6c are integrally supported and move along an unrepresented rail also in the direction Y with a speed equal to a half of that of said scanning unit 4, whereby the optical path length from any point being scanned to an imaging lens to be explained later remains always constant regardless of the position of the scanning unit 4 in the subsidiary scanning direction Y. In case the imaging device is composed of a solid-state imaging element such as a charge-coupled device (CCD), electronic scanning is conducted in a main scanning direction perpendicular to said direction Y. There are further provided a magnet 7 mounted under the scanning unit 4; and magnetic sensors 8B, 8G, 8R which are so positioned as to respectively face said magnet 7 when the scanning unit 4 is positioned to face said reference charts 3B, 3G, 3R. Said magnetic sensors 8B, 8G, 8R constitute a reference chart detecting sensor (numeral 8 in FIG. 5) to be explained later, the output signal of which is supplied through an I/O port III, to be explained later, to a control CPU (central processing unit) indicated by a numeral 64 in FIG. 5.

When halogen lamps 5, 5' illuminate the reference chart 3B, 3G or 3R, or the original 2, the resulting reflected light is guided by the mirrors 6a, 6b, 6c and a near-infrared cut-off filter 9, an imaging lens 10 and color separation filters 11 and received by a CCD 12 representing an example of the imaging device. FIG. 3 is a front view of the color separation filters 11 seen from a direction A wherein blue, green and red filters 11B, 11G, 11R are mounted in an opaque support member in angularly symmetrical positions around a shaft 13 so as to be positioned in front of the CCD 12 by the rotation of said shaft 13 with a motor for example. Although there is only one CCD shown in FIG. 2, there may be arranged plural CCD's along the main scanning direction which is perpendicular to the plane of FIG. 2.

In the apparatus shown in FIG. 2, the scanning unit 4 illuminates the reference charts 3B, 3G and 3R, prior to the scanning of the original. When said unit 4 illuminates the reference chart 3B, 3G or 3R, the magnetic sensor 8B, 8G or 8R respectively faces the magnet 7 to generate an exposure signal, and the color separation filter unit 11 is rotated in synchronization with the scanning unit 4 in such a manner that the filter 11B, 11G or 11R respectively is positioned in front of the CCD 12. The scanning motion of the scanning unit 4 is operated either in a mode of in succession illuminating the reference chart 3B, then scanning the original 2, illuminating the reference chart 3G, scanning the original 2, illuminating the reference chart 3R and finally scanning the original 2, or in another mode of at first illuminating the reference charts 3B, 3G and 3R and then scanning the original 2 three times, respectively selecting the filters 11 in the order of blue, green and red. Thus the color separation filters 11 are controlled in such a manner that the light passing through the filter 11B, 11G or 11R in synchronization with three scannings is guided to the CCD 12. Also instead of using the reference charts 3B, 3G, 3R and the magnetic sensors 8B, 8G, 8R mentioned above, it is possible to receive the reflected light from a white reference chart with the CCD 12 through the filter 11B, 11G or 11R, to detect the positional information of said filter with a separate sensor and to supply said information to the control CPU through an encoder.

In the following description reference is made to the embodiment shown in the attached drawings. In the image reading optical system shown in FIG. 2 the original is fixed while the light source is rendered movable, but the present invention is likewise applicable to a structure in which the light source is fixed while the original, including the reference charts, is rendered movable. It is furthermore possible to utilize transmitted light in place of reflected light.

Furthermore the present invention is applicable to a structure provided with plural imaging devices (CCD's) respectively for different colors.

Now there will be given an explanation of the image signal output device while making reference to FIG. 4.

Figure 4:
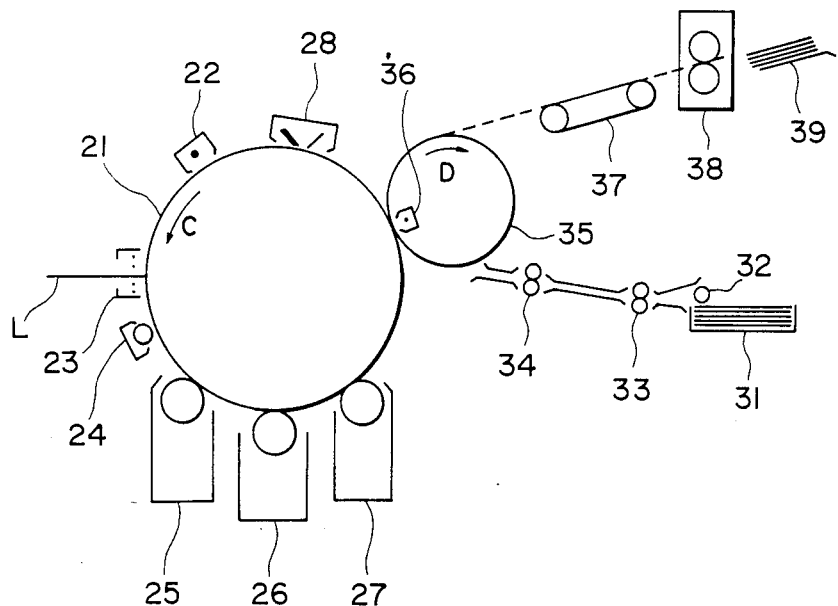
FIG. 4 is a schematic cross-sectional view of a color laser beam printer constituting an example of the image signal output device for use in a color image reading apparatus.

FIG. 4 shows a laser beam printer constituting an example of the output device for the signals read by CCD 12 and processing in an image signal processing device to be explained later in relation to FIGS. 5A and 5B. A laser beam L is modulated by the output signals of the above-mentioned image signal processing device. A modulating device for said modulation and a polygonal mirror, an f-$\theta$ lens, etc., for deflecting and focusing said modulated laser beam onto a photosensitive drum, to be explained later, are already known in the art and will therefore not be explained further. A photosensitive drum 21 is provided, for example, with a three-layered photosensitive member composed of a conductive layer, a CdS photoconductive layer and an insulating layer and is rotated in a direction C. There are provided a primary charger 22 and a secondary charger 23. The photosensitive drum is at first charged, for example negatively, by the primary charger, then scanned with the laser beam L simultaneously with charging, for example positive, by the secondary charger 23, and is uniformly exposed to the light from a blanking lamp 24 to form an electrostatic latent image, which is subsequently developed in a corresponding one of developing units 25, 26, 27 respectively having yellow, magenta and cyan developers. The surface of the photosensitive drum 21 is cleaned by a cleaning unit 28, and subjected to charge elimination by an unrepresented charge eliminator for a succeeding imaging cycle. The above-mentioned image development is controlled in such a manner that the yellow, magenta or cyan developing unit 25, 26, 27 is activated in synchronization with the color separation with the blue, green or red filter 11B, 11G, 11R. The polarity of the above-mentioned charging operation is determined according to the type of the photoconductive layer.

A recording material, such as a recording sheet, contained in a cassette 31 is fed by a feeding roller 32, then controlled in timing by registration rollers 33, and supplied through transport rollers 34 to a transfer drum 35 rotated in a direction D, where the image developed on the photosensitive drum 21 is transferred onto the recording sheet by means of a transfer charger 36. In order to obtain a color reproduction, the image development and transfer are repeated three times by activating the developing units 25, 26 and 27 respectively corresponding to the color separation with the color separation filter 11B, 11G or 11R. Consequently the recording sheet receives the images developed with three different developers in overlapping manner. After the image transfer the recording sheet is separated from the transfer drum 35, supplied to a conveyor belt 37 to a fixing unit 38 and, after image fixation, discharged to a tray 39.

It is to be noted that the above-described color laser beam printer constitutes only an example of the output device for the image reading apparatus of the present invention, and the output information may therefore be printed by an ink jet printer, or stored in a digital video disk or a computer disk file, or transmitted through a facsimile system.

Now there will be explained the image signal processing device.

Figure 5A:
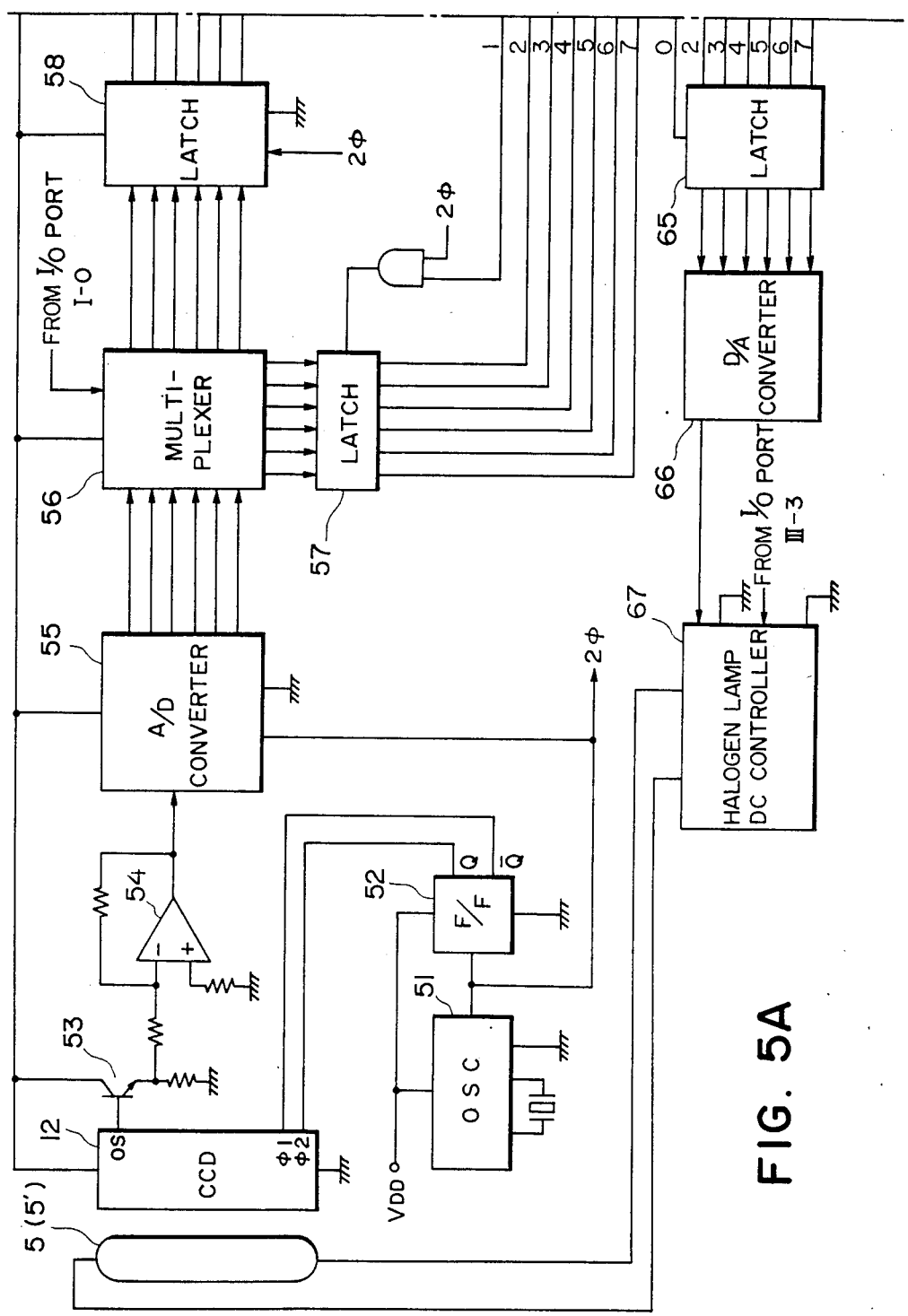

FIGS. 5A and 5B together show an example of a device for controlling the light intensity of the halogen lamps 5, 5' in response to the signals obtained by reading the reference charts 3B-3R shown in FIG. 2. As explained before, in synchronization with the illumination of the reference charts 3B-3R with the halogen lamp 5, 5', one of the color separation filters 11B-11R corresponding to the color of the illuminated chart is inserted into the reading optical system, and the light transmitted by said filter is photoelectrically converted by the CCD 12 and released as a serial signal. The CCD 12 is controlled by transfer clock signals $\phi 1$ and $\phi 2$ respectively supplied from output terminals Q, $\overline{Q}$ of a flip-flop 52 controlled by the output signal of a crystal-controlled oscillator 51. The entire device shown in FIGS. 5A and 5B is controlled by signals $2\phi$ synchronized with said transfer clock signals for the CCD 12. The signal read from the CCD 12 is amplified in an amplifier 53 and an operational amplifier 54, and supplied to an A/D converter 55 for converting the input signals into 6-bit digital signals. If necessary there may be provided, in front of or behind the A/D converter, a shading correction circuit for correcting the shading characteristic resulting from uneven light intensity distribution of the light source and from a light intensity loss in the peripheral field of the imaging lens.

The output signals from the A/D converter 55 are supplied to a multiplexer 56, from which output signals are supplied to an I/O port I through a latch circuit 57 when a high-level signal is supplied from an I/O port I-0 of the control CPU 64. Said high-level signal is output upon the lighting of the halogen lamp and start of the scanning unit 4 (FIG. 2) to scan the reference charts 3B, 3G, 3R. When said signal is shifted to the low level state thereafter, the output of the multiplexer 56 is connected through a latch circuit 58 to a comparator 59 and the laser modulating circuit 62, whereby the output signals are released to said comparator 59, under synchronization by the latch circuit 58 with the aforementioned signals $2\phi$ synchronized with the transfer clock signals. The output signals from the latch circuit 58 are compared, in the comparator 59, with data stored in a dither ROM (threshold determining circuit) controlled by a counter 60 synchronized with horizontal synchronization signals of the main scanning of the reading optical system shown in FIG. 2, and supplied, after conversion into binary digital signals, to the laser modulating circuit 62 for modulating the laser beam generated by a laser unit 63. The above-mentioned conversion is conducted in such a manner as to obtain a serial 1-bit binary signal from a 6-bit parallel signal obtained from the A/D converter 55. In the above-described apparatus intermediate tones can be reproduced by means of the values stored in the dither ROM 61. Also, the modulation of the laser beam may be conducted in the laser unit 63 instead of by a separate modulator.

Figure 1:
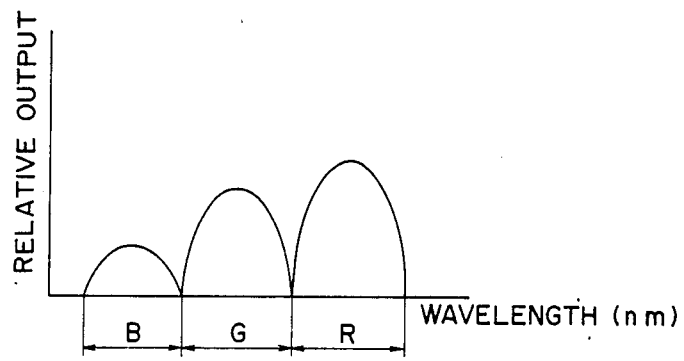
FIG. 1 is a chart showing image output signals of an image reading device utilizing a halogen lamp.

On the other hand, the signals entered into the I/O port I are processed in the following manner. The latch circuit 57 performs latching operation by the output signal of the I/O port I-1 at the timings of illumination of the reference charts 3B, 3G, 3R by the scanning unit 4, thereby supplying the image signals from the CCD 12 into I/O ports I-2 to I-7. Said signals are stored in a memory area N in a random access memory (RAM) of the control CPU 64. Also data for light intensity control are stored for each signal B, G or R in the control sequence in an address M of the RAM, and said data are adjusted for blue, green or red, for example $D_B=60$, $D_G=50$ or $D_R=40$ in order to compensate for uneven light distribution of the halogen lamps 5, 5' as shown in FIG. 1. The above-mentioned numerals 60, 50, and 40 represent control data representing the ratios of the light quantity of the halogen lamps 5 and 5' for the respective colors. For example, if the relative light quantity for obtaining the blue signal is given by the numeral 60, the relative light quantities for obtaining the green and red signals are given by the numerals 50 and 40, respectively. Then the control CPU 64 compares the image signals supplied from the CCD 12 to the I/O ports I-2 to I-7 with a determined value, for example, 01H, to be explained later. The control output signal obtained in said comparison, to be explained later, is supplied from one of I/O ports II-2 to II-7 through a latch circuit 65 to a D/A converter 66 for conversion into an analog signal, and then supplied to a halogen lamp DC controller 67, which is utilized for controlling, by means of the output voltage thereof, the light intensity from the halogen lamps 5, 5' and is, for example, composed of a device ETU-5H750L manufactured by Matsushita Electric Works Co., Ltd. Color setting switches 68B, 68G, 68R respectively for blue, green and red colors supply setting signals through an I/O port IV to the control CPU 64.

Figure 6:
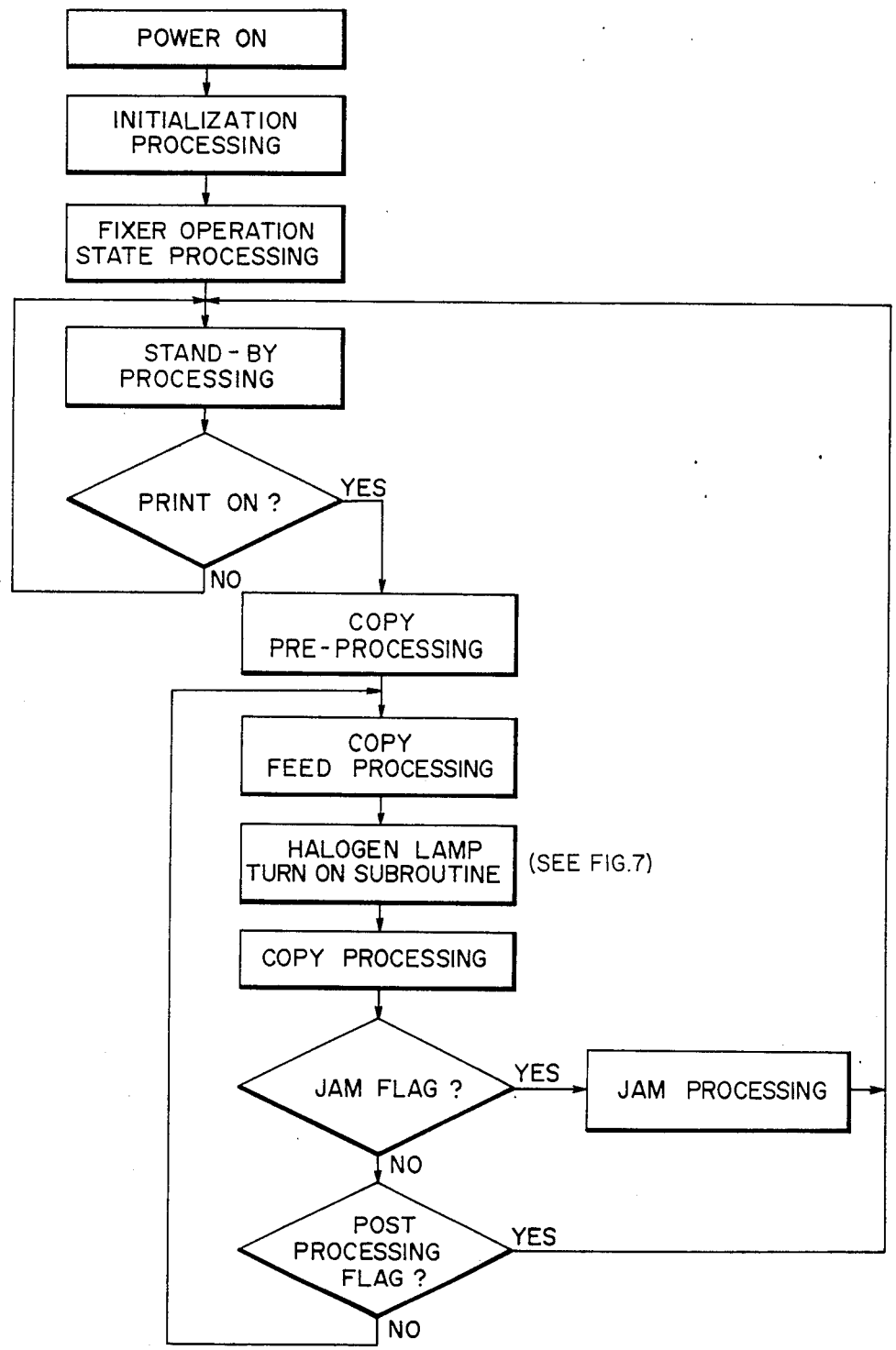
FIGS. 6, 7A, 7B and 8 are flow charts showing examples of the function of the color image reading apparatus, wherein FIG. 6 indicates a main routine, FIGS. 7A and 7B (FIG. 7 showing how they are assembled) indicate a lamp lighting routine and FIG. 8 indicates a subroutine for detecting blue, green and red signals.

Now, an explanation of the overall function of the color image reading apparatus shown in FIGS. 2 to 5 will be given, while making reference to the flow charts shown in FIGS. 6, 7A, 7B and 8. The programs shown in said flow charts are stored in advance in a read-only memory in the microcomputer constituting the control CPU 64. FIG. 6 shows a main routine controlling the operation of the entire apparatus, in which the CPU executes, subsequent to the start of power supply, an initialization step, such as RAM resetting, a fixing unit preparation step, such as temperature control for thermal fixation, and a stand-by process for position adjustments of optical system and photosensitive drum, and then discriminates whether a print start instruction from the operator is entered, and, if not, repeats the stand-by process mentioned above. If the print instruction is given, a step for preparation for copying, a sheet feeding step such as winding a sheet around the transfer drum 35 shown in FIG. 4, a subroutine for lighting the halogen lamps shown in FIG. 7, and a step of executing the copying cycle are executed. Then, if a jam flag is present, the program returns to the stand-by process after the execution of a jam process step, or if said jam flag is absent, there is discriminated the presence of a post-process flag, indicating the completion a predetermined number of copies, each copy including three exposures, one exposure for each of the colors blue, green and red. In the presence of said flag the program returns to the stand-by process for awaiting the copying of the next original, and, if said flag is absent, the program returns to the sheet feeding step.

Figure 7A:
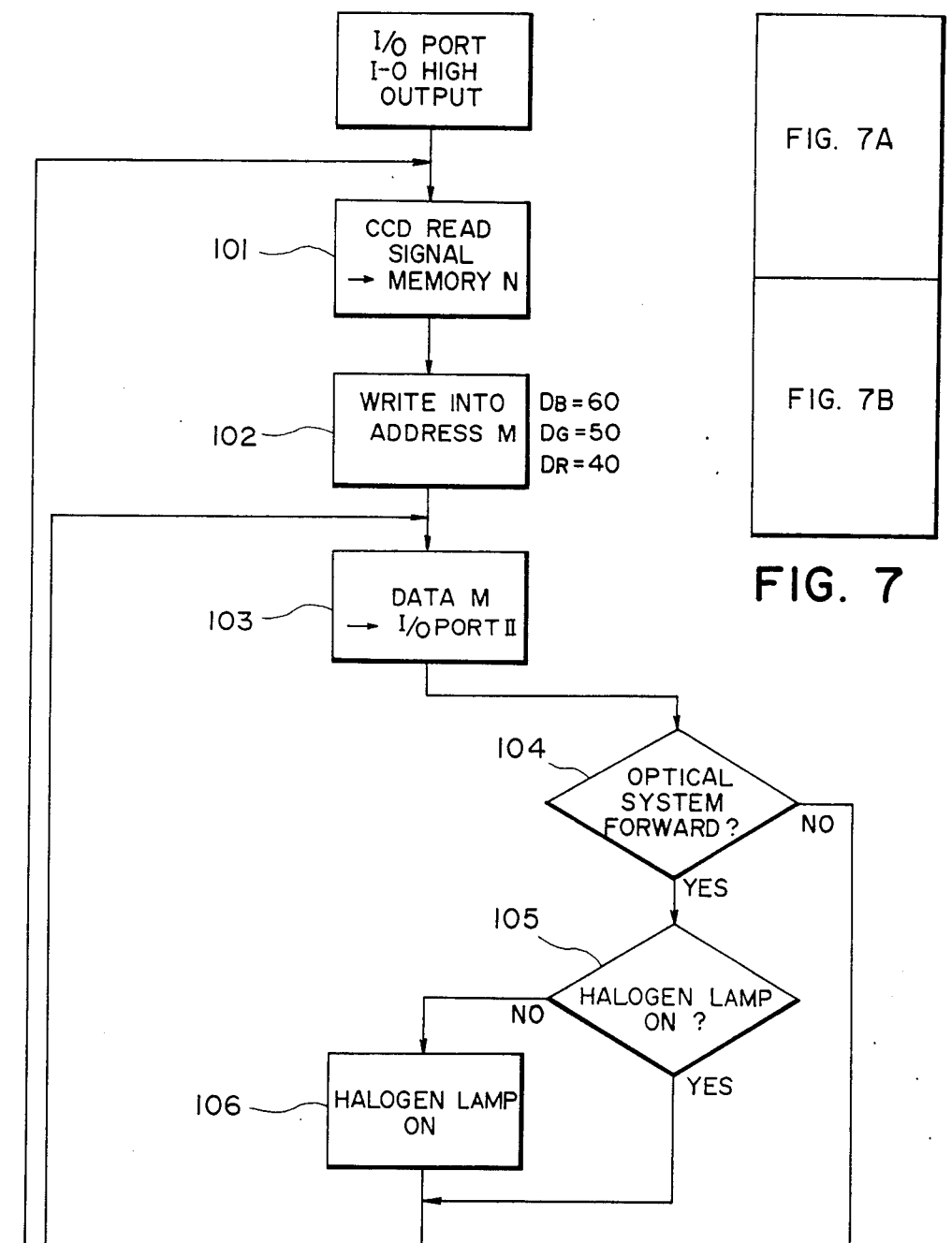

Now, with reference to the lamp lighting subroutine shown in FIGS. 7A and 7B, the light intensity control operation for the halogen lamps constituting the principal feature of the present invention will be explained. For the purpose of explanation, an embodiment in which the scanning unit 4 at first scans the blue, green and red reference charts 3B, 3G, 3R in succession and then scans the original three times will be considered. As explained before, while the I/O port I-0 releases a high-level output signal, the output signal from the multiplexer 56 is supplied through the I/O port I to the control CPU 64, whereby the image signals from the CCD 12 are stored in the memory area N of the RAM in the control CPU 64 (step 101). Also control data suitably for blue, green and red, for example $D_B=60$, $D_G=50$ and $D_R=40$, thereby constituting the reference values for the comparison process to be explained later (step 102). Then the data stored in said address M of the RAM are supplied to the I/O ports II-2–II-7, and the output signal of the I/O port II-0 is shifted to the high level state for causing the latching operation of the latch 65 (step 103). Then confirmations are made that the optical system is in the forward movement mode (step 104) and that the halogen lamps are turned on (step 105), and the program proceeds to a blue-green-red discriminating subroutine (step 107; FIG. 8). The program proceeds further if output signals are obtained from the reference chart sensor 8 respectively corresponding to the timings of blue, green and red determined in the control sequence of the CPU 64. If the optical system is not moving forward in the step 104, a trouble processing step is conducted (step 116), and, if the halogen lamps 5, 5' are not lighted in the step 105, a lamp lighting step is executed (step 106).

For the purpose of comparing the image signals from the CCD 12 with the determined value, the 6-bit (64-level) output signals of said CCD 12 are converted in the A/D converter 55 (FIG. 5) generally in such a manner that the white and black levels of the original are represented by 00H and 3FH, wherein H stands for a hexadecimal code. In the present embodiment, however, the white and black levels are respectively represented by 01H and 3EH for following reason. If 00H is selected to represent the white level, it is difficult to identify whether the signal has reached a maximum level or is already in a saturated level. For this reason 01H is selected for the white level for accurately discriminating the arrival at the maximum level. Similarly, the black level is represented by 3EH instead of 3FH. In the foregoing explanation, the white level means the maximum level of the signal obtained by photoelectric conversion in the CCD 12 from the light reflected from the reference chart of blue, green or red color and transmitted by the corresponding color separation filter 11B, 11G or 11R. Then, when one of the aforementioned control data $D_B$, $D_G$, $D_R$ stored in the address M is released through the I/O port II corresponding to the exposure for blue, green or red color, the image signal from the CCD 12 is compared with the determined value 01H. If the former is smaller, the comparison is repeated again with a new control output signal D' larger by 1 than the preceding signal D (for example $D_B'=D_B+1$). On the other hand, if the former is larger, the comparison is repeated with a new control output signal D' made smaller by 1 (for example $D_B'=D_B-1$) (steps 109, 110, 111). For this purpose the control output signal D is supplied through the latch 65, and, after digital-to-analog conversion in the D/A converter 66, supplied to the halogen lamp DC controller 67, which is activated by a signal from the I/O port III-3 and supplies the halogen lamps 5, 5' with a control voltage corresponding to the above-mentioned analog signal. The generation of said control voltage is achieved by conducting pulse width modulation on the output signals of an unrepresented pulse generator according to said analog signal in such a manner as to increase or decrease the pulse width in response to the level of the analog signal. In this manner the light intensity control of the halogen lamps 5, 5' is achieved by adjustment of power supply through the regulation of duty ratio of said pulses. If the blue, green or red detection signal is still on after the step 110 or 111, the program returns to the step 103. On the other hand, if said detection signal is off (step 112), a process for compensating for defects in or failure of the CCD and the halogen lamps is executed (step 113). When the output signal from the CCD 12 reaches 01H after the above-described procedure, if the output signal of reference chart detection is not a red signal, the CPU identifies that the reference chart reading is not completed for the reference charts 3G and 3R or for the reference chart 3R, and the program returns to the step 101 for repeating the above-described procedure for the remaining reference chart or charts. On the other hand, if a red signal is obtained, indicating the completion of reading of all the reference charts, the program proceeds to the copy processing step in the main routine shown in FIG. 6. When the step 113 is executed in FIG. 7B a step 115 is executed in succession. The control output signals D determined as aforementioned for each of the blue, green and red reference charts are stored in the RAM of the control CPU 64, and are utilized for light intensity control for each color-separated scanning of the original. In this manner, it is rendered possible to maintain the image signals from the CCD at a constant level regardless of the spectral distribution characteristic of the halogen lamps and of possible fluctuation in the performance of the CCD and of the color separation filters. Also the effect of light loss in the peripheral field of the imaging lens 10 (FIG. 2) can be alleviated if the output signals of the I/O ports I-2 to I-7 shown in FIGS. 5A and 5B are latched at the center of the CCD. Furthermore the light intensity control of the halogen lamps or other light source can also be achieved through a phase control method instead of the aforementioned pulse width modulation method.

Figure 7B:
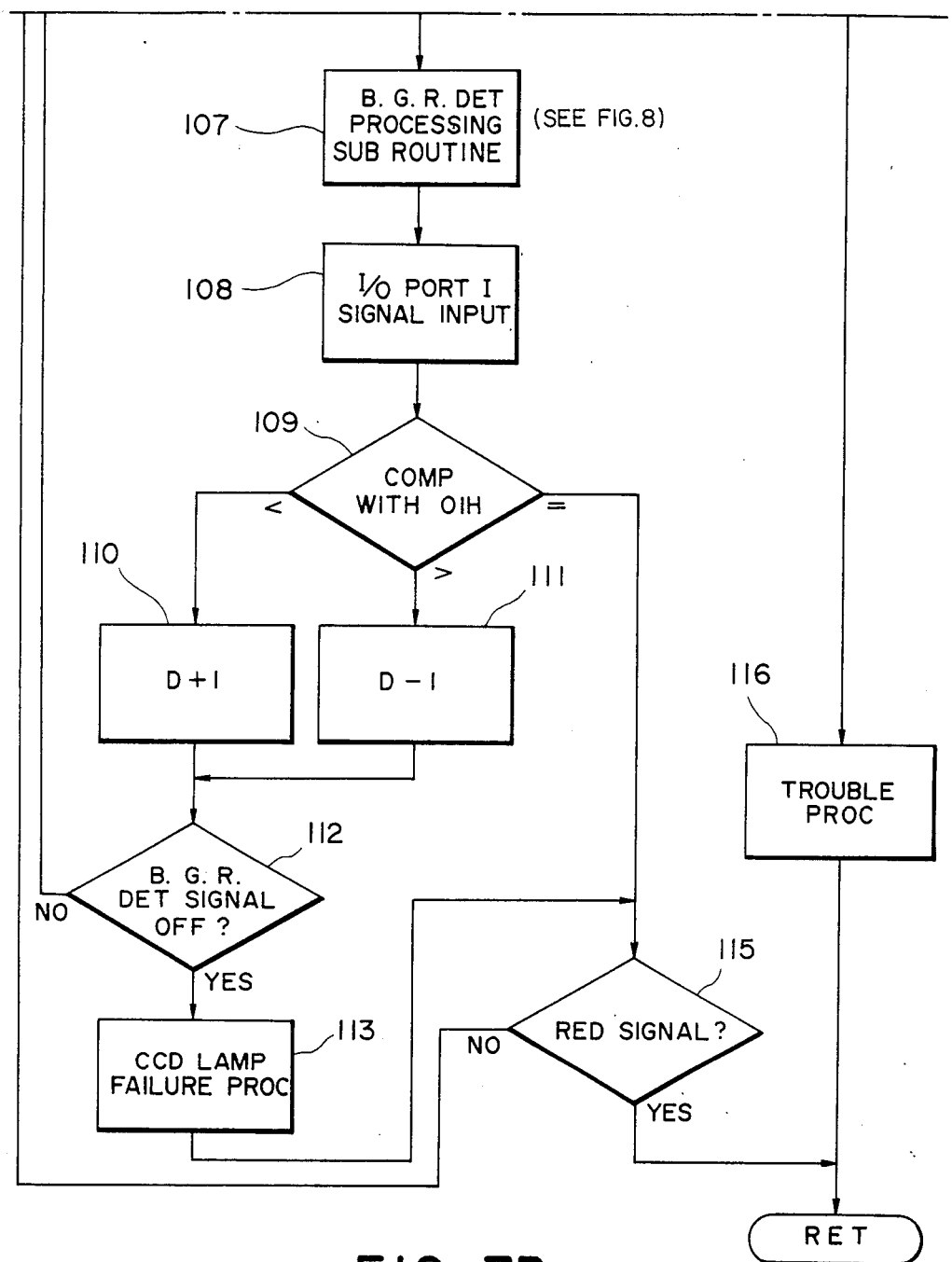
Figure 8:
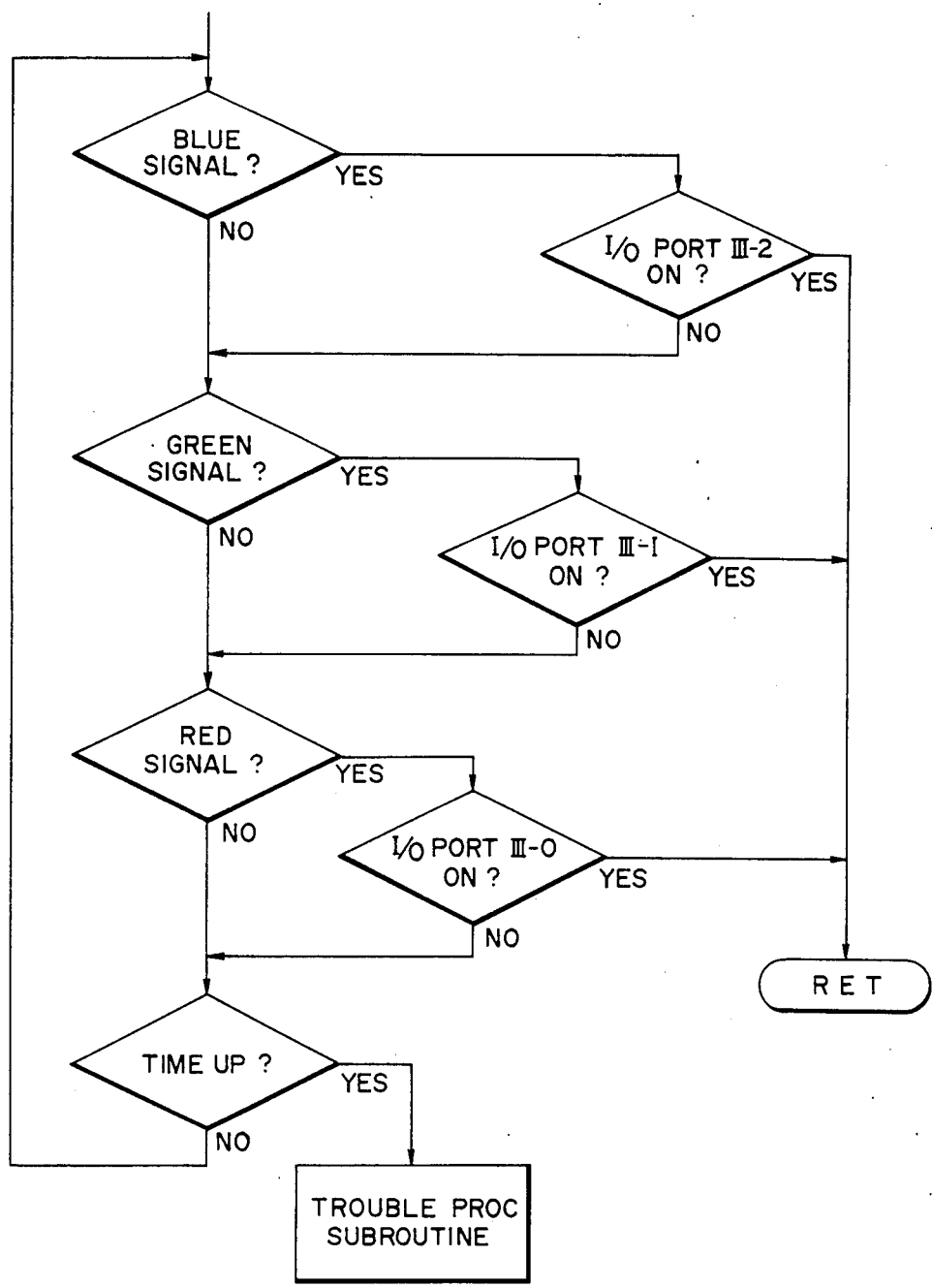

FIG. 8 shows a blue-green-red signal detecting subroutine shown in the step 107 in FIG. 7B. At first blue, green or red signal determined in the control sequence of the control CPU 64 is identified by a corresponding flag, and a discrimination is made whether the I/O port III-2, III-1 or III-0 is turned on respectively in response to the blue, green or red signal. If said I/O port is on, indicating that the corresponding reference chart can be read, the program proceeds to a step 108 shown in FIG. 7B. If the I/O port III-2 or III-1 is off, identification of the green signal or the red signal is conducted in succession. Also if the I/O port III-0 is off, there is executed a discrimination whether a predetermined scanning time for the scanning unit 4 has expired, and, if not, the program returns to the blue signal discriminating step to repeat the above-described procedure. On the other hand, if said scanning time has expired, the program proceeds to the trouble processing subroutine.

The above-described procedure is to maintain a constant signal level from the CCD12, but it is also possible to obtain an arbitrary color hue by conducting the aforementioned comparisons with modified reference values through the use of the switches 68B, 68G, 68R shown in FIG. 5B.

As explained in the foregoing, it is rendered possible, in the color image reading apparatus, to arbitrarily control the light intensity of the light source for illuminating the original, for each separated color exposure. It is therefore possible to obtain output signals of desired levels through the intensity control of the light source for each separated color, regardless of uneven spectral distribution of the light source and of eventual fluctuation in the spectral sensitivity of imaging element or in the performance of the color separation filters.

In the foregoing embodiment all the reference charts are read for determining the exposure for each color prior to the original scannings in three colors, but the present invention is applicable also to a method in which a reference chart of a color is read for determining the exposure prior to the original reading of the corresponding color.

Also the present invention is advantageous in cost and structure since the light intensity of the light source for illuminating the original is measured by the imaging element for original scanning, not requiring particular sensors. Furthermore adequate control is achieved since the light intensity control is conducted with the actually read signals.

What is claimed is:

1. A color image reading apparatus comprising:
a light source, the intensity of light produced thereby varying in accordance with the amount of power supplied thereto;
reading means for photoelectrically reading a color document illuminated by said light source a plurality of times and for generating a plurality of color component signals representing the color document a different one of said plurality of color component signals being generated during each reading of said color document;
a reference area which can be illuminated by said light source;
means for causing said reading means to read said reference area illuminated by said light source prior to reading the color document to generate a plurality of reference color component signals; and
means for controlling the amount of power supplied to said light source during each reading of said color document by said reading means in accordance with the plurality of reference color component signals generated by said reading means.

2. A color image reading apparatus according to claim 1, wherein said controlling means controls the amount of power supplied to said light source such that each of the levels of said plurality of reference color component signals becomes equal to a predetermined level when said reading means reads said reference area.

3. A color image reading apparatus according to claim 1, wherein said reading means comprises an optical member for separating light reflected from the color document into a plurality of color components.

4. A color image reading apparatus according to claim 1, wherein said reading means includes a line sensor for reading a color image of the color document, said line sensor reading the color image during relative movement of said line sensor and said color document.

5. A color image reading apparatus according to claim 1, wherein said apparatus further comprises means for forming a color image on a recording material based on the plurality of color component signals generated by said reading means.

6. A color image reading apparatus according to claim 1, wherein said controlling means comprises means for determining light intensities of said light source suitable for illuminating said color document during each reading of said color document by said reading means in accordance with said plurality of reference color component signals, and wherein said controlling means controls the amount of power supplied to said light source in accordance with said suitable light intensities determined by said determining means so as to illuminate the color document with said suitable light intensities to enable said reading means to read a color image of the color document.

7. A color image reading apparatus according to claim 6, further comprising storing means for storing data relating to said suitable light intensities determined by said determining means, and wherein said controlling means controls the amount of power supplied to said light source in accordance with the data stored in said storing means.

8. A color image reading apparatus according to claim 6, wherein said determining means determines said suitable light intensities by adjusting the light intensity of said light source by controlling the amount of power supplied to said light source until each of the levels of said plurality of reference color component signals becomes equal to a predetermined level.

9. A color image reading apparatus according to claim 1, wherein said reference area comprises a plurality of color reference areas each corresponding to an associated one of the plurality of reference color component signals.

* * * * *

UNITED STATES PATENT AND TRADEMARK OFFICE
CERTIFICATE OF CORRECTION

PATENT NO. : 4,679,073                  Page 1 of 2

DATED : July 7, 1987

INVENTOR(S) : KIMIYOSHI HAYASHI

It is certified that error appears in the above-identified patent and that said Letters Patent is hereby corrected as shown below:

COLUMN 2

Line 51,   "information" should read --include information--.

COLUMN 5

Line 65,   "63 instead" should read --63 itself instead--.

COLUMN 6

Line 59,   "completion" should read --completion of--.

COLUMN 7

Lines 11-12,   "data suitably" should read --data are written in the address area M of the RAM suitably--.

Line 40,   "for" should read --for the--.

COLUMN 8

Line 27,   "7B" should read --7B,--.
    Line 47,   "blue," should read --a blue,--.
    Line 66,   "CCD12," should read --CCD 12,--.

UNITED STATES PATENT AND TRADEMARK OFFICE
CERTIFICATE OF CORRECTION

PATENT NO. : 4,679,073

DATED : July 7, 1987

INVENTOR(S) : KIMIYOSHI HAYASHI

It is certified that error appears in the above-identified patent and that said Letters Patent is hereby corrected as shown below:

COLUMN 9

Lines 35-36, "document a" should read --document, a--.

Signed and Sealed this

Seventeenth Day of November, 1987

Attest:

DONALD J. QUIGG

Attesting Officer

Commissioner of Patents and Trademarks